Aug. 31, 1948. H. V. ATWELL 2,448,290
PROCESS FOR THE PRODUCTION OF SYNTHESIS GAS
Filed Dec. 18, 1943
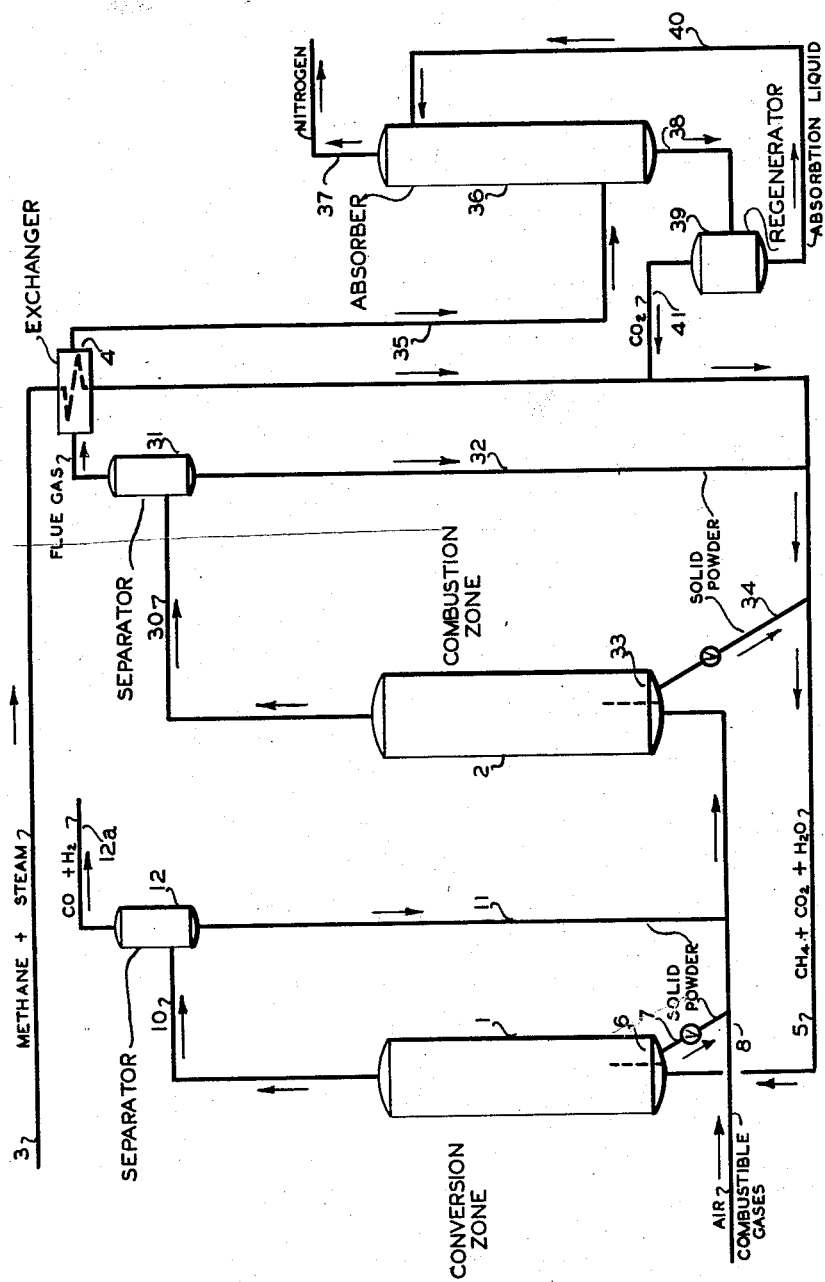
HAROLD V. ATWELL
INVENTOR
BY
HIS ATTORNEY Patented Aug. 31, 1948

2,448,290

UNITED STATES PATENT OFFICE 2,448,290

PROCESS FOR THE PRODUCTION OF SYNTHESIS GAS

Harold V. Atwell, Beacon, N. Y., assignor, by mesne assignments, to The Texas Company, New York, N. Y., a corporation of Delaware Application December 18, 1943, Serial No. 514,769

3 Claims. (Cl. 23—212)

This invention relates to a continuous method of manufacturing water gas involving the reaction of a gaseous hydrocarbon with carbon dioxide and steam so as to produce carbon monoxide and hydrogen.

Broadly, the invention contemplates effecting the reaction during flow of the reactants through a conversion zone in the presence of a powdered solid heat carrier suspended in the reactants, the heat carrier serving to supply heat for the reaction, which reaction is of an endothermic nature. The carrier is removed continuously from the conversion zone, passed through a combustion zone wherein its heat content is restored and thereafter returned to the conversion zone at an elevated temperature sufficient to provide heat for the reaction.

In the combustion zone combustion is supported at least in part by carbonaceous material which has accumulated on the carrier material during passage through the conversion zone. If the amount of this carbonaceous material is insufficient, combustible gases may be introduced to the combustion zone from an extraneous source.

More specifically, the invention involves reacting a gaseous hydrocarbon such as methane with carbon dioxide and steam in the presence of a powdered material, such as alumina, magnesia, and diatomaceous earth, etc., at a temperature in the range 1500 to 2500° F., and preferably at a temperature about 1800 to 2000° F. The reactant gases are charged in the proportion of about 4 mols methane, 3 mols steam, and 1 mol carbon dioxide.

Under these conditions the methane reacts with steam and carbon dioxide to form a gas containing carbon monoxide and hydrogen in about the proportion of 1 mol carbon monoxide to 2 mols of hydrogen, and therefore, suitable as a synthesis gas for the subsequent conversion into hydrocarbons having 2 or more carbon atoms per molecule.

It is also contemplated that the reaction conditions and composition of the charge to the conversion reaction may vary from the foregoing; for example, it may be desired to modify the conditions of reaction so as to produce a synthesis gas containing carbon monoxide and hydrogen in proportions suitable for the production of oxygenated hydrocarbons.

Since the reactions of methane with steam and with carbon dioxide are highly endothermic reactions, and since they also require a high reaction temperature, it is difficult to carry them out in externally heated reaction zones. Accordingly, the present invention involves subjecting the reactant gases to contact with a finely divided solid material previously heated to a temperature sufficiently elevated to provide the heat for the reaction. Advantageously, the carrier material is suspended in the reactant gases flowing through the reaction zone. The carrier material may be impregnated with or have deposited thereon a catalytic agent such as metallic nickel or mixtures of nickel with manganese which are capable of promoting the conversion reaction; for example, the solid material may comprise fire clay or alumina having these catalytic agents deposited thereon.

Other types of material may be used as the carrier material, as for example, fuller's earth, Filtrol, and various natural or synthetic gels such as alumina-silica compounds.

The heat carrier material is advantageously used in the form of a powder having a particle size of about 50 to 500 microns.

The products of reaction and the used carrier are continuously removed from the conversion zone. The used carrier having some carbonaceous material disposed thereon is passed to a combustion zone wherein it is subjected to contact with air or combustion gases at a temperature in the range about 2000 to 2500° F. so as to effect combustion of the carbon and also raise the carrier material to an elevated temperature.

The products of combustion and the reheated carrier powder are continuously withdrawn from the combustion zone and the reheated powder recycled to the conversion zone.

The products of combustion containing carbon dioxide are passed to an absorption zone wherein carbon dioxide is removed from the other gases and the carbon dioxide so recovered is advantageously passed to the conversion zone.

The hot products of combustion may be used to preheat the methane and steam, and if desired may be used also to preheat the air or combustion gases passing to the combustion zone.

An important advantage of the process resides in the employment of a continuous method of flow. A further advantage involves maintaining uniform reaction conditions within the conversion zone thereby producing a product of uniform composition, namely, carbon monoxide and hydrogen, in the desired molecular proportions. A still further advantage involves the production of a synthesis gas which is free from nitrogen.

An important feature of the invention has to do with circulation of the heat carrier material in finely divided form through the conversion and combustion zones while suspended in the streams of gaseous reactants passing through these zones. In this way the solid material is fluidized by the streams of gas thereby expediting its movement through the system. By operating in this manner it is possible to take advantage of the heat liberated in the combustion zone to supply the heat required in carrying out the endothermic reaction in the conversion zone.

In order to describe the invention, reference will now be made to the accompanying drawing showing a flow diagram illustrative of one method of practicing the process.

The numeral 1 refers to a conversion zone in the form of a vertical vessel or tower wherein the conversion of methane to carbon monoxide and hydrogen is effected. The numeral 2 refers to a separate but similar type of vessel employed as a combustion zone wherein the carbonaceous material is burned from the used carrier material so as to restore it to a highly heated condition.

As indicated in the drawing, methane and steam and also $CO_2$, if desired, may be conducted from a source not shown through a pipe 3 and passed to a heat exchanger 4 wherein the methane and steam are brought into indirect heat exchange relationship with flue gas and to which reference will be made later. The resulting preheated stream of methane and steam then passes through a pipe 5 communicating with the bottom of the conversion vessel 1.

The powdered heat carrier material is introduced to the pipe 5 from sources which will be referred to later, and the introduced powder is carried through the pipe 5 by the stream of methane and steam flowing therethrough.

The powder is introduced to the pipe 5 in the proper proportion to maintain the desired temperature. The velocity of the gas is adjusted so as to carry the powder into the vessel 1 and maintain it suspended in the stream of gas flowing through the vessel.

The powder upon introduction to the pipe 5 is at a temperature of at least 1800 to 2000° F. so as to effect the reaction between methane, steam, and carbon dioxide, which reaction may be carried out under pressures ranging from atmospheric to 200 pounds per square inch gauge.

Some of the powder accumulates in the bottom portion of the vessel 1 behind a baffle 6 and may be continuously drawn off through a pipe 7 communicating with a pipe 8, to which reference will be made later. The gaseous products of reaction containing suspended powder are continuously drawn off from the top of the vessel 1 through a pipe 10 leading to a separator 12. Separator 12 may be of the cyclone type, adapted to effect separation of the entrained powder from the gases. A plurality of separators or filters may be used if desired. Also a combination of centrifugal and electrical precipitators may be used.

The separated powder is continuously drawn off from the bottom of the separator through a pipe 11 which communicates with the previously mentioned pipe 8. The gaseous products containing carbon monoxide and hydrogen are discharged from the top of the separator through a pipe 12A. The discharged gas stream may be subjected to any desired type of treatment to effect further purification. For example, it may be scrubbed with a suitable chemical agent to effect removal of sulfur compounds. It may also be passed through an absorption zone to effect removal of residual carbon dioxide after which it is suitable as a synthesis gas.

Air, and if desired combustible gases, may be introduced from a source not shown to the pipe 8 which communicates with the bottom of the combustion zone 2. The air and gas is utilized to force the solid powder from the pipe 7 and 11 into the bottom of the combustion zone.

The combustion zone, as previously mentioned, is maintained under conditions adapted to burn carbonaceous material deposited on the powder or introduced in the form of combustible gases.

The products of combustion are drawn off from the top of the combustion zone 2 through a pipe 30 leading to a separator 31 wherein suspended powder is separated from the flue gas.

The separated powder is drawn from the bottom of separator 31 through pipe 32 leading to the previously mentioned pipe 5.

A substantial portion of the powder may accumulate in the section 33 of the combustion zone 2 and is continuously drawn off through a pipe 34 which also communicates with pipe 5.

It is thus contemplated that in the combustion zone 2 the powdered carrier material will be maintained largely suspended in the gases undergoing combustion. The flue gas from the separator 31 passes through the exchanger 4 giving up its heat to the entering stream of methane and steam.

The resulting cooled flue gas, with further cooling if necessary by means not shown, then passes through a pipe 35 to an absorption tower 36 wherein it may be scrubbed with triethanolamine or other suitable agents adapted to remove carbon dioxide from residual nitrogen and carbon monoxide.

The residual gases are discharged from the absorber through a pipe 37, while the scrubbing agent containing $CO_2$ is drawn off through a pipe 38 to a regenerator 39.

In the generator 39 conditions are maintained such as to strip the carbon dioxide from the absorption liquid, the latter being returned to the absorber through a pipe 40.

The carbon dioxide is conducted through a pipe 41 which communicates with the pipe 5 and in this way is passed to the conversion zone 1.

Instead of introducing the powdered material to the bottom portion of the zones 1 and 2, it is contemplated that the powder may be introduced to the upper portions of these zones so as to provide downflow rather than upflow conditions.

Mention has been made of charging methane to the conversion zone. However, it is contemplated that other gaseous hydrocarbons, such as ethane, propane, butane, or mixtures thereof may be used—also mixtures of methane with any one or more of these gaseous hydrocarbons.

It is contemplated that in order to accomplish reheating in the smallest possible space and with the shortest amount of time, it may be advantageous to use a heat carrier capable of catalyzing surface combustion. Mention has already been made of catalyzing the conversion reaction with a catalyst such as nickel disposed on the heat carrier. According to one method of operation contemplated, the nickel catalyst may be disposed on Raschig rings or similar supports, offering relatively little resistance to the flow of gas. This supporting material containing the catalyst remains stationary in the conversion reaction zone, while the reactant gases containing suspended heat carrier powder pass through the supported catalyst.

Obviously, many modifications and variations may be made in the invention as herein set forth without departing from the spirit and scope thereof, and therefore only such limitations should be imposed as are indicated in the appended claims.

I claim:

1. In a process for the production of a mixture of carbon monoxide and hydrogen wherein a gaseous hydrocarbon and a gas selected from the group consisting of steam and carbon dioxide are reacted by passing a preheated stream of said reactants through a reaction zone at reaction temperature in contact with a solid catalyst in a stationary bed provided with passages for the flow of reactants therethrough, the improvement which comprises supplying to the reaction zone all of the additional heat required for carrying on the reaction by suspending in the reactant stream in the reaction zone a powdered solid heat carrier at an elevated temperature substantially above the reaction temperature and in an amount sufficient to supply heat for the reaction and maintain the reaction temperature; withdrawing from said reaction zone a gaseous effluent stream comprising hydrogen, carbon monoxide and powdered heat carrier, separating said heat carrier from the effluent stream; passing the separated powdered heat carrier through a heating zone; heating the heat carrier in the heating zone to the aforesaid elevated temperature; withdrawing heated powdered heat carrier from the heating zone; and supplying said heat carrier at said elevated temperature to the reactant stream entering the conversion zone.

2. A process as defined by claim 1 wherein the heat carrier is heated to said elevated temperature by suspension in gases undergoing combustion.

3. A process as defined in claim 1 wherein the powdered heat carrier is capable of catalyzing surface combustion.

HAROLD V. ATWELL.

REFERENCES CITED

The following references are of record in the file of this patent:

UNITED STATES PATENTS

| Number | Name | Date |
|---|---|---|
| 1,984,380 | Odell | Dec. 18, 1934 |
| 2,253,486 | Belchetz | Aug. 19, 1941 |
| 2,325,516 | Holt et al. | July 27, 1943 |
| 2,355,753 | Roberts, Jr. | Aug. 15, 1944 |
| 2,360,463 | Arveson | Oct. 17, 1944 |
| 2,363,274 | Wolk et al. | Nov. 21, 1944 |
| 2,417,973 | Degnen | Mar. 25, 1947 |